(12) United States Patent
Paros et al.

(10) Patent No.: US 11,474,126 B2
(45) Date of Patent: Oct. 18, 2022

(54) HIGH PRECISION ROTATION SENSOR AND METHOD

(71) Applicant: Quartz Seismic Sensors, Inc., Redmond, WA (US)

(72) Inventors: Jerome M. Paros, Kirkland, WA (US); Krishna Venkateswara, Kenmore, WA (US)

(73) Assignee: QUARTZ SEISMIC SENSORS, INC., Redmond, WA (US)

(*) Notice: Subject to any disclaimer, the term of this patent is extended or adjusted under 35 U.S.C. 154(b) by 209 days.

(21) Appl. No.: 16/810,752

(22) Filed: Mar. 5, 2020

(65) Prior Publication Data

US 2021/0278432 A1 Sep. 9, 2021

(51) Int. Cl.
| | | |
|---|---|---|
| *G01P 15/03* | (2006.01) | |
| *G01P 15/097* | (2006.01) | |
| *G01P 15/08* | (2006.01) | |
| *G01P 21/00* | (2006.01) | |

(52) U.S. Cl.
CPC ........ *G01P 15/032* (2013.01); *G01P 15/0802* (2013.01); *G01P 15/097* (2013.01); *G01P 21/00* (2013.01)

(58) Field of Classification Search
CPC ... G01P 15/097; G01P 15/032; G01P 15/0802
See application file for complete search history.

(56) References Cited

U.S. PATENT DOCUMENTS

| | | |
|---|---|---|
| 2,293,437 A | 8/1942 | La Coste et al. |
| 2,854,581 A | 9/1958 | Scarrott |
| 2,984,111 A | 5/1961 | Kritz |
| 3,148,289 A | 9/1964 | Pijls et al. |
| 3,190,129 A | 6/1965 | Kritz et al. |
| 3,238,789 A | 3/1966 | Erdley |
| 3,440,888 A | 4/1969 | Southworth et al. |
| 3,465,597 A | 9/1969 | Riordan et al. |
| 3,470,400 A | 9/1969 | Weisbord |
| 3,474,672 A | 10/1969 | Lacoste et al. |
| 3,479,536 A | 11/1969 | Norris |
| 3,630,086 A | 12/1971 | Wilk |
| 4,091,679 A | 5/1978 | Furusawa et al. |
| 4,215,570 A | 8/1980 | Nisse |
| 4,280,206 A | 7/1981 | Guralp |
| 4,372,173 A | 2/1983 | Eernisse et al. |
| 4,415,827 A | 11/1983 | Chuang |
| 4,445,065 A * | 4/1984 | Albert ............. G01L 1/162 310/368 |
| 4,445,371 A | 5/1984 | Lautzenhiser |
| 4,457,077 A | 7/1984 | Lautzenhiser |
| 4,469,979 A | 9/1984 | Chuang |

(Continued)

OTHER PUBLICATIONS

Brokesova, Johana et al., Note: Rotaphone, a New Self-Calibrated Six-Degree-of-Freedom Seismic Sensor, Review of Scientific Instruments, vol. 83 Issue 8, pp. 1-4 Aug. 2012.

(Continued)

*Primary Examiner* — Helen C Kwok (74) *Attorney, Agent, or Firm* — Dorsey & Whitney LLP (57) ABSTRACT

A high precision rotation sensor comprises an inertial mass suspended from a base wherein the mass is responsive to rotational inputs that apply loads to load-sensitive resonators whose changes in resonant frequency are related to the applied loads.

26 Claims, 7 Drawing Sheets

(56) References Cited

U.S. PATENT DOCUMENTS

| | | | |
|---|---|---|---|
| 4,479,385 A | 10/1984 | Koehler | |
| 4,517,841 A * | 5/1985 | Peters | G01P 15/097 |
| | | | 73/DIG. 1 |
| 4,531,073 A | 7/1985 | Eernisse | |
| 4,656,383 A | 4/1987 | Albert | |
| 4,658,174 A | 4/1987 | Albert | |
| 4,658,175 A | 4/1987 | Albert | |
| 4,718,275 A * | 1/1988 | Norling | G01P 15/097 |
| | | | 73/497 |
| 4,743,790 A | 5/1988 | Albert | |
| 4,751,849 A * | 6/1988 | Paros | G01L 1/162 |
| | | | 73/778 |
| 4,757,228 A | 7/1988 | Kalinoski et al. | |
| 4,879,914 A * | 11/1989 | Norling | G01L 1/183 |
| | | | 73/778 |
| 4,881,408 A * | 11/1989 | Hulsing, II | G01P 15/097 |
| | | | 73/514.12 |
| 4,912,990 A | 4/1990 | Norling | |
| 4,939,935 A * | 7/1990 | Amand | G01P 15/097 |
| | | | 73/DIG. 1 |
| 4,980,598 A | 12/1990 | Albert | |
| 5,109,175 A | 4/1992 | Albert | |
| 5,112,126 A | 5/1992 | Graebner | |
| 5,170,665 A | 12/1992 | Janiaud et al. | |
| 5,334,901 A | 8/1994 | Albert et al. | |
| 5,341,681 A | 8/1994 | Molny et al. | |
| 5,461,914 A | 10/1995 | Zumberge et al. | |
| 5,596,145 A | 1/1997 | Albert et al. | |
| 5,606,124 A | 2/1997 | Doyle et al. | |
| 5,728,935 A | 3/1998 | Czompo | |
| 5,922,955 A | 7/1999 | Brun et al. | |
| 5,970,787 A | 10/1999 | Wignall | |
| 6,196,067 B1 | 3/2001 | Martin et al. | |
| 6,363,035 B1 | 3/2002 | Canuteson et al. | |
| 6,518,756 B1 | 2/2003 | Morys et al. | |
| 6,593,536 B1 | 7/2003 | Karasik | |
| 6,615,660 B1 | 9/2003 | Feinberg et al. | |
| 6,776,035 B2 | 8/2004 | Wijeyesekera et al. | |
| 6,776,042 B2 | 8/2004 | Pike et al. | |
| 6,826,960 B2 | 12/2004 | Schaad et al. | |
| 7,178,401 B2 | 2/2007 | Byrd | |
| 8,616,054 B2 | 12/2013 | Paros et al. | |
| 8,789,415 B2 | 7/2014 | Van Kann | |
| 9,645,267 B2 | 5/2017 | Paros et al. | |
| 2002/0092352 A1 * | 7/2002 | Foote | B81B 3/0051 |
| | | | 73/514.24 |
| 2010/0031746 A1 * | 2/2010 | Paros | G01V 1/184 |
| | | | 73/382 G |
| 2010/0186510 A1 * | 7/2010 | Robert | G01P 15/0802 |
| | | | 73/514.29 |
| 2012/0297877 A1 * | 11/2012 | Watanabe | G01P 15/097 |
| | | | 73/514.16 |
| 2013/0298675 A1 * | 11/2013 | Thiruvenkatanathan | |
| | | | G01P 9/04 |
| | | | 73/504.16 |
| 2014/0331770 A1 * | 11/2014 | Jourdan | B81B 3/00 |
| | | | 73/514.01 |
| 2016/0349283 A1 * | 12/2016 | Bramhavar | G01P 15/093 |
| 2020/0025792 A1 * | 1/2020 | Reinke | B81B 7/007 |
| 2020/0102211 A1 * | 4/2020 | Joet | B81B 3/0072 |
| 2020/0317505 A1 * | 10/2020 | Rey | B81B 3/0072 |
| 2021/0018378 A1 * | 1/2021 | Joet | G01L 1/18 |

OTHER PUBLICATIONS

Dergachev, et al., A High Precision, Compact Electromechanical Ground Rotation Senor, Review of Scientific Instruments, vol. 85, Issue 5, pp. 1-14 , May 2014.

Korth, et al., Passive, Free-Space Heterodyne Laser Gyroscope, Classical and Quantum Gravity, vol. 33 No. 3, pp. 1-16, Jan. 2016.

Lantz, et al., Review: Requirements for a Ground Rotation Sensor to Improve Advanced LIGO, Bulletin of the Seismological Society of America, vol. 99 No. 2B, pp. 980-989, May 2009.

Lee, et al., Introduction to the Special Issue on Rotational Seismology and Engineering Applications, Bulletin of the Seismology Society of America, vol. 99, No. 2B, pp. 945-957, May 2009.

Matichard, et al., Modeling and Experiment of the Suspended Seismometer Concept for Attenuating the Contribution of Tilt Motion in Horizontal Measurments, Review of Scientific Instruments, vol. 86, Issue 6, pp. 1-14, Feb. 2016.

Matichard, Fabrice et al., Review: Tilt-Free Low-Noise Seismometry, Bulletin of the Seismological Society of America, vol. 105, No. 2A, pp. 497-510, Apr. 2015.

Venkateswara, Krishna et al., A High-Precision Mechanical Absolute-Rotation Sensor, Review of Scientific Instruments, vol. 85, Issue 1, pp. 1-8, Jan. 2014.

Webb, Spahr et al., High-Resolution Seafloor Absolute Pressure Gauge Measurments Using a Better Countig Method, Journal of Atmospheric and Oceanic Technology, vol. 33, Issue 9, pp. 1859-1873, Sep. 2016.

* cited by examiner

HIGH PRECISION ROTATION SENSOR AND METHOD

TECHNICAL FIELD

The invention relates to high precision rotation sensors that employ resonant transducers as sensing elements.

BACKGROUND

Ever since the invention of long-period seismometers, distinguishing between interpreting the measured acceleration signal as that due to horizontal translation or that due to gravity through ground rotation has been problematic, for example as described in W. H. K Lee, M. Çelebi, M. I. Todorovska, and H. Igel, Introduction to the Special Issue on Rotational Seismology and Engineering Applications, Bulletin of the Seismological Society of America, Vol. 99, No. 2B, pp. 945-957, May 2009, doi: 10.1785/0120080344. In recent times, this became a particularly important problem to address as requirements for seismic isolation became more and more stringent for the advanced gravitational-wave detectors such as those described in B. Lantz, R. Schofield, B. O'Reilly, D. E. Clark, and D. DeBra, Review: Requirements for a Ground Rotation Sensor to Improve Advanced LIGO, Bulletin of the Seismological Society of America, Vol. 99, No. 2B, pp. 980-989, May 2009, doi: 10.1785/0120080199. Many types have been considered over the last several decades including mechanical beam-balances with optical or electromechanical readouts, ring-laser gyroscopic sensors, pairs of vertical acceleration sensors separated by a fixed baseline, and atom-interferometer based as described in W Z Korth, A Heptonstall, E D Hall, K Arai, E K Gustafson and R X Adhikari, Passive, free-space heterodyne laser gyroscope, Class. Quantum Grav. 33 (2016) 035004 (16 pp) and Johana Brokešová, Jiří Málek, and John R. Evans, Rotaphone: a new self-calibrated six-degree-of-freedom seismic sensor, Review of Scientific Instruments 83, 086108 (2012); doi: 10.1063/1.4747713. Large beam-balances with optical readouts have proven to have the lowest noise and largest bandwidth owing to their simplicity, large moments of inertia, and sensitive readouts as discussed in "A high precision mechanical absolute-rotation sensor"—Venkateswara, Krishna et al. Rev. Sci. Instrum. 85 (2014) 015005 arXiv:1401.4412 [physics.ins-det].

Progress in the science of measuring ground motion from distant earthquakes dates primarily to the last one hundred years. Key developments were the invention by LaCoste and Romberg of a long-period vertical seismograph in 1934, and the introduction of active electronic sensing and feedback pioneered by Block and Moore in the 1960's, culminating in what is still the state-of-the-art long-period leaf-spring seismometer of Wielandt and Streckeisen in 1982. These seismometers are constructed with large inertial masses supported by soft helical springs or curved leaf-springs and force-balance feedback systems. Improvements include using springs of constant modulus materials, advanced analog-to-digital converters, and digital filters. The primary output is an analog signal that is related to ground velocity, which can be converted to ground acceleration by differentiation. Typical sensitivities to slow ground acceleration are measured in nano-g's or better. To achieve the high sensitivity, the applied acceleration is usually limited to only about 1% of the earth's gravity. Thus the full scale range is limited and the output is clipped if the earthquake is strong.

On the other hand, the science of measuring ground acceleration directly, for instance with force-balance accelerometers, has resulted in devices that have a much larger acceleration full scale and are particularly sensitive at short time intervals. These devices are commonly called strong-motion sensors. Their shortcoming is that they are not very sensitive to weak long-period vertical ground acceleration. Another disadvantage of conventional long-period and strong-motion seismometers is the analog output of the sensor that is converted into a digital signal by an analog-to-digital converter with limited numeric dynamic range and poor long-term stability. Intrinsically digital linear acceleration sensors with frequency outputs that can be measured in the time domain in relation to a very precise clock standard can provide very high short-term resolution and high long-term stability.

A number of load-sensitive resonators have been described. Single vibrating beam force sensors are described in U.S. Pat. Nos. 3,470,400, 3,479,536, 4,445,065, 4,656,383, 4,658,174, 4,658,175, 4,743,790, 4,980,598, 5,109,175, and 5,596,145. Double vibrating beam force sensors referred to as Double-Ended Tuning Forks (DETF) are described in U.S. Pat. Nos. 2,854,581, 3,148,289, 3,238,789, 4,215,570, 4,372,173, 4,415,827, 4,469,979, 4,531,073, 4,757,228, and 4,912,990. The change in frequency of oscillation of the resonant force sensors is a measure of the applied force.

Single-axis accelerometers employing resonator beams are disclosed in U.S. Pat. Nos. 2,984,111, 3,190,129, 3,238,789, 3,440,888, 3,465,597, 4,091,679, 4,479,385, 4,980,598, 5,109,175, 5,170,665, 5,334,901, and 5,596,145. In general, these devices are open-loop sensors without servo feedback, consisting of an inertial mass that exerts a force on the resonator under acceleration along the sensitive axis. The inertial mass is usually guided by a suspension system or flexures. Triaxial accelerometers employing load-sensitive resonators are disclosed in U.S. Pat. Nos. 6,826,960, 7,178,401 and in U.S. Pat. No. 9,645,267.

A seismometer is an instrument that measures ground motion, velocity, or acceleration. The three quantities are interrelated by Newtonian physics. A time-series measurement of one of them can be used to find the other two, either by integration or by differentiation. In theory, it would not initially matter which quantity is measured, but, until now, practical considerations have favored velocity-based seismometers. The main reasons are sensitivity and bandwidth. The bandwidth of greatest interest in the detection of earthquakes is in the period range from about 1 to 100 seconds, usually referred to as the long-period domain. Conventional seismometers have large inertial masses supported by weak springs with a damped natural oscillation in the long-period range. As such, they are optimized for long-period velocity measurements. The sensitivity trails off for fast ground motion and very slow changes of acceleration or gravity. Similarly, rotation sensors can measure angular acceleration, angular rate, or angle. A time-series measurement of one of them can be used to find the other two, either by integration or by differentiation.

SUMMARY

A sensor is disclosed for providing high-resolution, inherently digital measurements of rotational inputs. The sensor includes an inertial mass that is suspended from a base such that rotational inputs generate torques and forces that are coupled to load-sensitive resonators either directly or via a force or torque transmitting arrangement. Mechanical overload stops are placed to limit the small motion of the inertial mass such that the loads stay within the acceptable range of the load-sensitive resonators. The load-sensitive resonators are set into their natural resonant frequencies by electronic means, and the resultant frequency output signals are measured with high-resolution frequency-period counters. The changes in resonant frequency are thus high-resolution, inherently digital measurements of rotational inputs and derived values of angular rate and rotation.

DETAILED DESCRIPTION

The following description of certain embodiments is merely exemplary in nature and is in no way intended to limit the invention or its applications or uses. In the following detailed description of embodiments of the present apparatuses, systems, and methods, reference is made to the accompanying drawings which form a part hereof, and which are shown by way of illustration specific embodiments in which the described apparatuses, systems, and methods may be practiced. These embodiments are described in sufficient detail to enable those skilled in the art to practice presently disclosed apparatuses, systems, and methods, and it is to be understood that other embodiments may be utilized and that structural and logical changes may be made without departing from the spirit and scope of the present apparatuses, systems, and methods. Moreover, for the purpose of clarity, detailed descriptions of certain features will not be discussed when they would be apparent to those with skill in the art so as not to obscure the description of the present apparatuses, systems, and methods. The following detailed description is therefore not to be taken in a limiting sense, and the scope of the present apparatuses, systems, and methods is defined only by the appended claims.

The digital high precision rotation sensor of this disclosure measures rotational inputs directly. The dynamic range is defined as the region between sensor resolution and full scale output. The dynamic range is usually expressed in decibels, dB, defined as the base-10 logarithm of the ratio between full scale and resolution, multiplied by 20. For instance, a sensor that provides output with a sensitivity of one part per million of full scale range has a dynamic range of 120 dB. Conventional state-of-the-art rotation sensors may produce an analog voltage output that is converted into digital form with an analog-to-digital converter. This conversion is currently done with 24 binary bits (145 dB) including some margin of over-ranging. In order to achieve high sensitivities, the full scale measurement range is limited.

The digital high precision rotation sensor of this disclosure is based on the principle of measuring the rotational inputs with inherently digital load-sensitive resonators. The output of the load-sensitive resonator is the amplified waveform of its natural resonant frequency that changes with rotational inputs. Thus, the change in resonant frequency is a measure of ground rotation. The frequency output is measured with high-speed clocks in the time-domain, which is inherently much more precise than the conversion of an analog signal to a digital one. Conventional commercial frequency counters with 200 to 300 MHz counting clocks can measure frequencies over a dynamic range of 200 dB at 1 Hz sampling. The period change of the load-sensitive resonator is typically 10% of frequency, such that 180 dB of dynamic range of acceleration is possible. Counting algorithms based on over-sampling, in conjunction with finite impulse response (FIR) or infinite impulse response (IIR) filters and high-speed clocks and processors allow acceleration dynamic ranges to 200 dB or greater as explained in Spahr C. Webb and Scott L Nooner, High-Resolution Seafloor Absolute Pressure Gauge Measurements Using a Better Counting Method, *Journal of Atmospheric and Oceanic Technology*, September 2016. Thus, high-resolution measurements of strong rotations are now possible.

Linear accelerometers, seismometers and tiltmeters with pendulously suspended masses are inherently susceptible to angular accelerations. Also, as described in Review: Tilt-Free Low-Noise Seismometry, Matichard, Fabrice and Evans, Matthew (2015) *Review: Tilt-Free Low-Noise Seismometry*. Bulletin of the Seismological Society of America, 105 (2A). pp. 497-510. ISSN 0037-1106, conventional accelerometers, seismometers and tiltmeters cannot distinguish between horizontal acceleration and rotation of the ground.

The primary objective of this disclosure is the design of high-resolution, inherently digital rotation sensors that directly measure rotational effects over a broad frequency spectrum. It is achieved with digital high-resolution load-sensitive resonators sensing rotational inputs on an inertial mass that is suspended from a base.

Figure 1A:
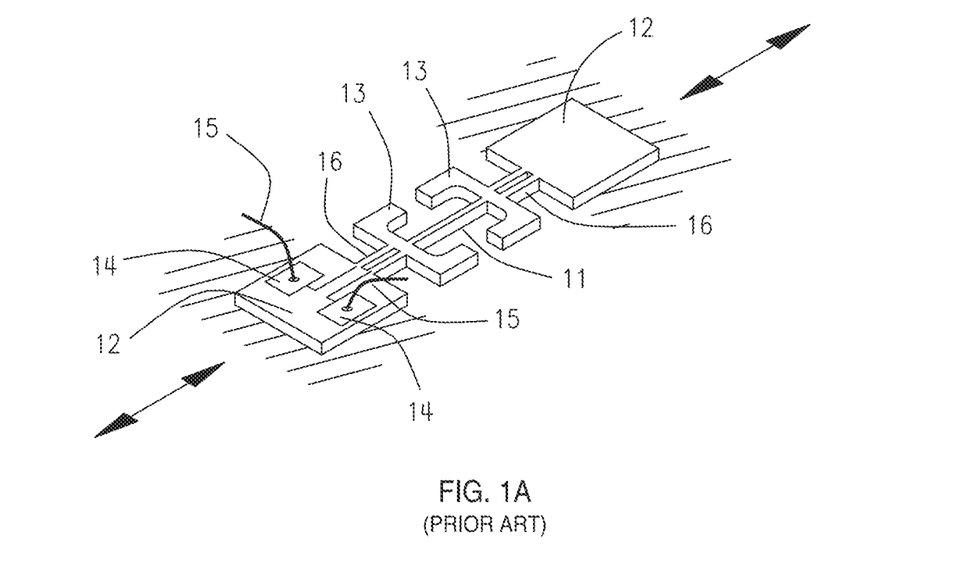
FIG. 1A is an isometric view of a conventional single-beam load-sensitive resonator.
Figure 1B:
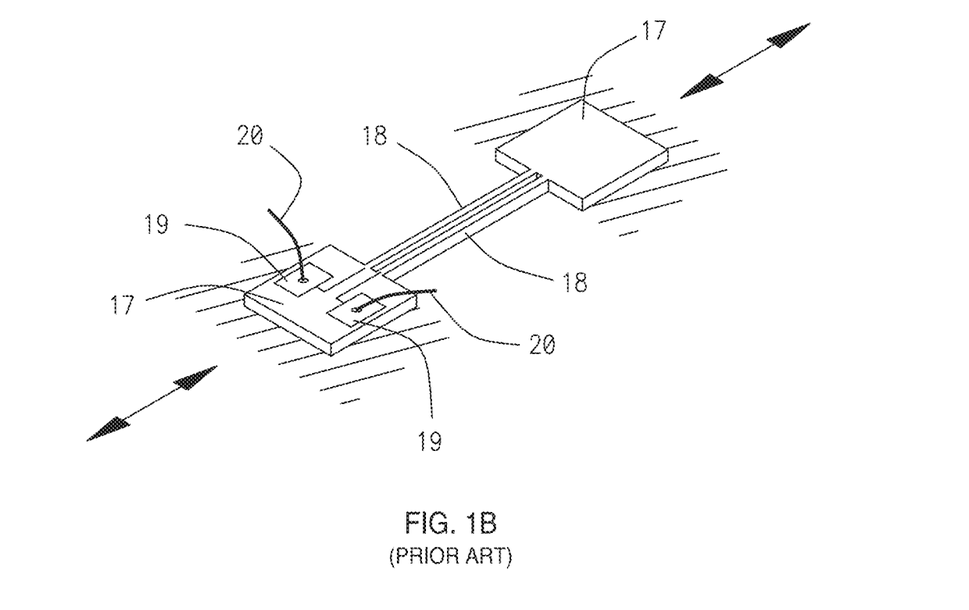
FIG. 1B is an isometric view of a conventional dual-beam load-sensitive resonator.

FIGS. 1A and 1B depict prior art high precision force-sensitive resonator sensing elements that are loaded between mounting pads 12 and 17, respectively. In FIG. 1A, the resonator is a center span vibrating beam 11, isolated by a low-frequency mechanical filter consisting of isolating masses 13 and isolating springs 16 between the attachment pads 12 and the masses 13. Resonant transducers can be made with double-ended tuning forks as shown in FIG. 1B. The tines 18 are elongated beams with dimensions chosen to make the resonant frequency of the transducer a strong function of applied tension or compression. These high precision resonant transducers are designed and constructed such that there is a high sensitivity to the applied load, and the tight constraints result in small displacements along the force axis. If the resonators are fabricated from piezoelectric quartz, they can be excited into their natural resonant frequency by electrical traces 14 and 19, respectively, and connected to an oscillator circuit by connections 15 and 20 respectively. Measurements of the frequency outputs of the oscillators are thus measures of the forces applied to the load-sensitive resonators.

Mechanical rotation-sensors are the rotational analogues of broadband seismometers. They employ a low stiffness rotational spring in the form of a flexural hinge or a knife-edge and a large moment of inertia resulting in a low resonant-frequency system. The angular position of the moving mass is measured with respect to the frame using optical or electromechanical sensors. Critically, the center of mass of the system is positioned close to the rotational pivot to ensure minimal response to horizontal acceleration. Typically, they are used in an open loop configuration or are actively damped at resonance.

Figure 2:
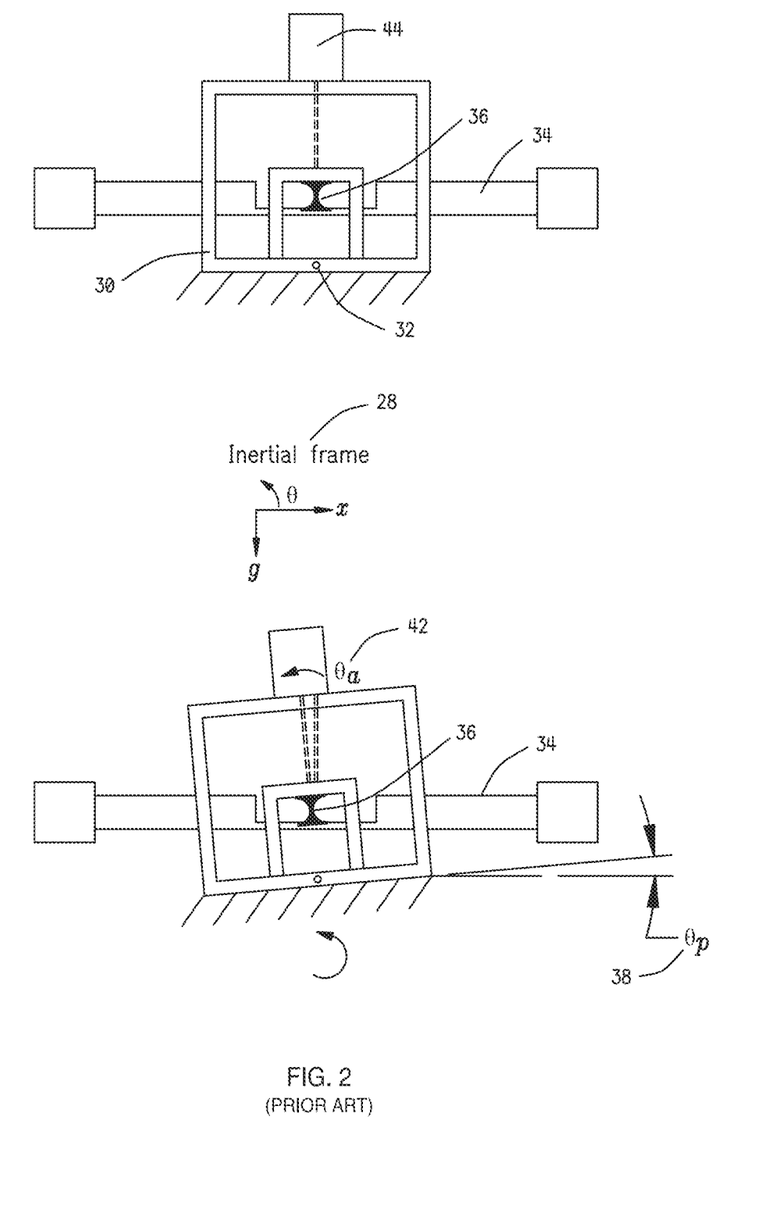
FIG. 2 are planar schematic views of a conventional beam rotation sensor.

FIG. 2 depicts a conventional prior art beam-balance rotation sensor in inertial frame 28. Platform 30 is mounted to the ground at reference point 32. Balanced beam 34 is suspended by thin flexure hinges 36. Ground rotation $\theta_p$ 38 produces an angular response $\theta_a$ 42 that is measured optically by autocollimator 44.

The torque on the conventional beam balance in the lab-frame can be written in the frequency domain as $$\tau_{lab}(\omega) = I\omega^2\theta_a + I\omega_0^2(1+i\varphi)\theta_a$$

Where I is the moment of inertia of the balanced beam 34, $\omega_0$ is the resonant frequency and $\varphi$ is the loss factor of the beam balance.

Using the equations of motion and in the absence of external torques, the lab-measured torque can be shown to be $$\tau_{lab}(\omega) = I\omega^2\theta_p - M\delta(g\theta_p - x\omega^2)$$

Where $\theta_p$ is the angle of the platform (or ground) with respect to an inertial frame, M is the total mass of the balance, $\delta$ is the vertical distance between the center of mass and the pivot axis, and x is the horizontal translation of the reference point. At low frequencies (<<1 Hz), it is generally safe to ignore the small translation produced from the tilt of the lever arm from the reference point 32 to the pivot point of flexure hinges 36 since the lever arm and tilt is usually small. Ideally, the center of mass is adjusted so that the second term is ≈0.

Figure 3A:
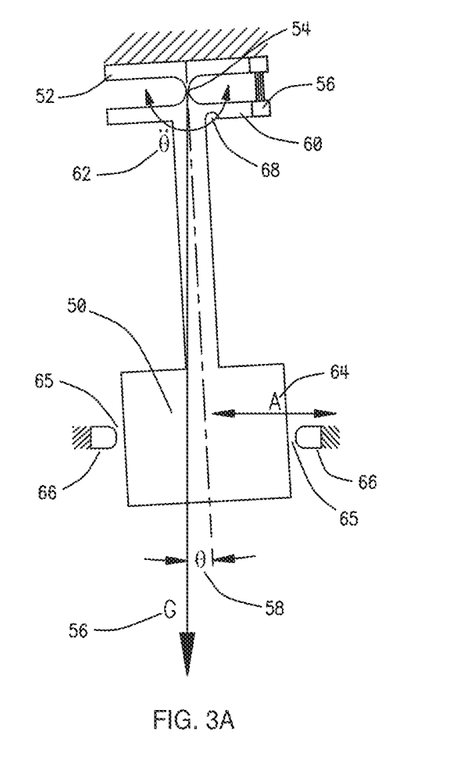
FIG. 3A is a planar view of a digital high precision rotation sensor using a load-sensitive resonator to detect rotational inputs of a pendulous mass suspended from a flexure hinge pivot according to an embodiment of the present disclosure.

FIG. 3A is a planar view of a digital high precision rotation sensor according to an embodiment of the disclosure. Pendulous mass 50 is suspended from base 52 by flexure hinge pivot 54. Force-sensitive resonator 56 is mounted between base 52 and pendulous mass 50 through torque and force-transmitting arm 60. Rotational inputs load resonator 56 to change its resonant frequency and the change in resonant frequency is a digital measure of the applied load. Rotational inputs are generated by angular accelerations, horizontal accelerations, and tilts. Angular accelerations $\ddot{\Theta}$ 62 act on the moment of inertia of pendulous mass 50 to generate torques about flexure hinge pivot 54 to apply loads to resonator 56 through arm 60. Horizontal accelerations A 64 act on the mass of pendulous mass 50 to generate torques about flexure hinge pivot 54 to apply loads to resonator 56 through arm 60. Tilts to the rotation sensor relative to Earth's plumb line gravity vector G 56 by angle $\Theta$ 58 generate torques about flexure hinge pivot 54 to apply loads to resonator 56 through arm 60 that are equivalent to a horizontal acceleration of G*sin $\Theta$. Mechanical overload stops 66 are placed to limit the small motion of the inertial mass 50 such that the loads stay within the acceptable range of the load-sensitive resonators. The range of travel before engaging overload stops 66 can be increased by adding compliant elements to torque and force-transmitting arm 60 such as flexure 68. If the rotation sensor is hermetically sealed with an inert gas, gaps 65 between inertial mass 50 and overload stops 66 provide damping.

Figure 3B:
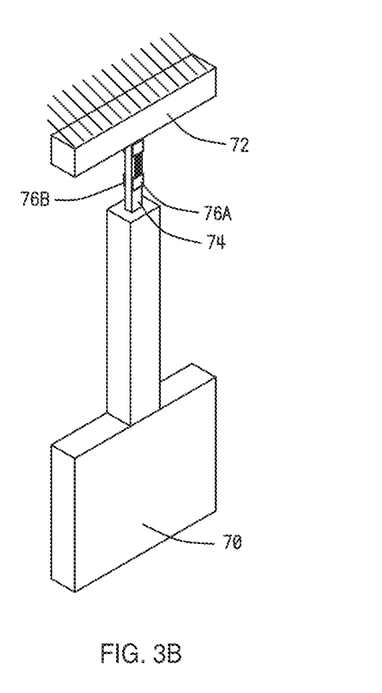
FIG. 3B is an isometric view of a digital high precision rotation sensor using load-sensitive resonators to detect rotational inputs applied to a pendulous mass suspended from a bending beam pivot according to an embodiment of the present disclosure.

FIG. 3B is an isometric view of a digital high precision rotation sensor according to an embodiment of the disclosure. Pendulous mass 70 is suspended from base 72 by bending beam 74. A load-sensitive resonator 76A is mounted on one side of bending beam 74. Rotational inputs create bending stresses in beam 74 that are transmitted to resonator 76A and the change in resonant frequency is a digital measure of the applied load. Rotational inputs are generated by angular accelerations, horizontal accelerations, and tilts as described previously for FIG. 3A. A second load-sensitive resonator 76B is optionally mounted on the opposite side of bending beam 74. Rotational inputs will change the frequencies of resonators 76A and 76B with opposite polarities since the bending stresses in beam 74 are tensile on one side and compressive on the opposite side. The scaled difference between the outputs of resonators 76A and 76B may provide enhanced measures of the rotational inputs because the sensitivity may be doubled and common-mode errors, such as those due to temperature, may be reduced through subtraction.

Figure 3C:
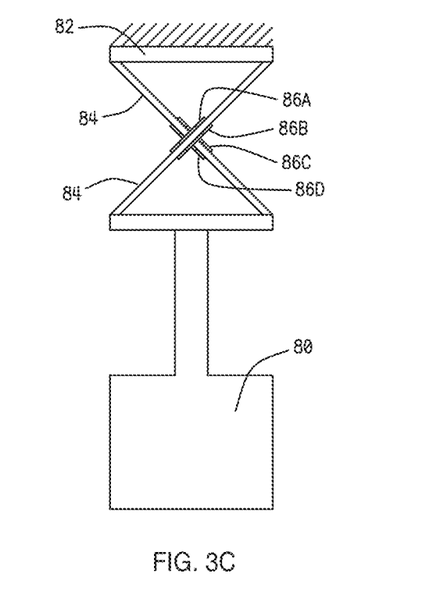
FIG. 3C is a planar view of a digital high precision rotation sensor using load-sensitive resonators to detect rotational inputs applied to a pendulous mass suspended from a crossed bending beam pivot according to an embodiment of the present disclosure.

FIG. 3C is a planar view of a digital high precision rotation sensor according to an embodiment of the disclosure. Pendulous mass 80 is suspended from base 82 by crossed flexing beams pivot 84. A load-sensitive resonator 86A is mounted on one of the crossed flexing beams pivot 84. Rotational inputs create bending stresses in crossed flexing beams pivot 84 that are transmitted to resonator 86A and the change in resonant frequency is a digital measure of the applied loads. Rotational inputs are generated by angular accelerations, horizontal accelerations, and tilts as described previously for FIG. 3A. Additional load-sensitive resonators 86B, 86C, and 86D, are optionally mounted on each side of crossed flexing beams pivot 84. Rotational inputs will change the frequencies of all resonators 86A through 86D with similar or opposite polarities (tensile or compressive) dependent on their orientation on crossed flexing beams pivot 84. The processing of multiple resonator outputs may reduce common-mode errors and improve accuracy and performance.

Figure 4A:
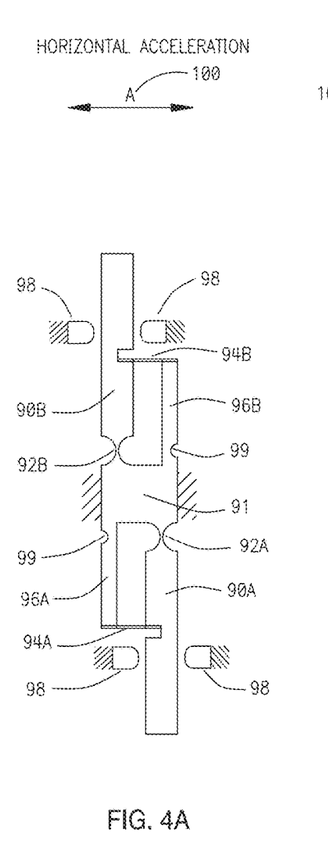
FIG. 4A is a planar view of a combined digital high precision rotation and horizontal acceleration sensor with two inertial masses suspended by flexure hinge pivots in relatively inverted positions and independently coupled to load-sensitive resonators such that for linear horizontal accelerations applied to the inertial masses, one resonator senses compressive stresses, while the other senses tensile stresses according to an embodiment of the present disclosure. For angular accelerations, the two resonators have the same polarity and thus horizontal accelerations can be distinguished from angular accelerations and tilt effects.

FIG. 4A is a planar view of a combined digital high precision rotation and horizontal acceleration sensor according to an embodiment of the disclosure. Inertial mass 90A is pendulously suspended from base 91 by flexure hinge 92A. Mass 90A is coupled to load-sensitive resonator 94A through force and torque transmitting arm 96A. Inertial mass 90B is suspended from base 91 by flexure hinge 92B in an inverted position (rotated 180 degrees) relative to mass 90A. Mass 90B is coupled to load-sensitive resonator 94B through force and torque transmitting arm 96B. Mechanical overload stops 98 are placed to limit the small motion of the inertial masses 90A and 90B such that the loads stay within the acceptable range of the load-sensitive resonators. The range of travel before engaging overload stops 98 can be increased by adding compliant elements to torque and force-transmitting arms 96A and 96B such as flexures 99. For linear horizontal accelerations A 100 applied to inertial masses 90A and 90B, one resonator (either 94A or 94B) senses compressive stresses, while the other senses tensile stresses. For angular accelerations G 102, the two resonators have the same polarity (compressive or tensile). Thus linear accelerations $\ddot{\Theta}$ 100 are proportional to the difference in the scaled outputs from resonators 94A and 94B. Angular accelerations $\ddot{\Theta}$ 102 are proportional to the sum of the scaled outputs from resonators 94A and 94B. Tilts of base 91 relative to Earth's plumb line gravity vector G 106 by angle $\Theta$ 104 apply loads to resonators 94A and 94B that are equivalent to a horizontal acceleration of G*sin $\Theta$. The angular acceleration $\ddot{\Theta}$ 102 may be doubly integrated to calculate angle $\Theta$ 104 and determine tilt effects.

Figure 4B:
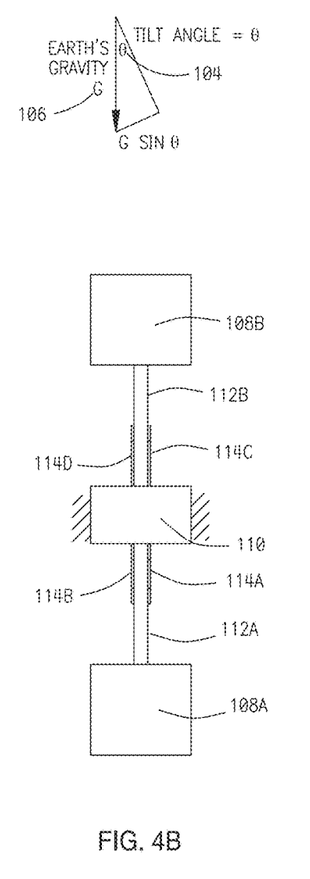
FIG. 4B is a planar view of a combined digital high precision rotation and horizontal acceleration sensor with two inertial masses suspended by bending beams in relatively inverted positions and coupled to load-sensitive resonators according to an embodiment of the present disclosure such that for linear horizontal accelerations applied to the inertial masses, some resonators sense compressive stresses, while the others sense tensile stresses. For angular accelerations, the other resonators have the same polarity and thus horizontal accelerations can be distinguished from angular accelerations and tilt effects.

FIG. 4B is a planar view of a combined digital high precision rotation and horizontal acceleration sensor according to an embodiment of the disclosure. Pendulous mass 108A is suspended from base 110 by bending beam 112A. A load-sensitive resonator 114A is mounted on one side of bending beam 112A. Rotational and horizontal acceleration inputs create bending stresses in beam 112A that are transmitted to resonator 114A and the change in resonant frequency is a digital measure of the applied load. A second load-sensitive resonator 114B is mounted on the opposite side of bending beam 112A. Inertial mass 108B is suspended from base 110 by bending beam 112B in an inverted position (rotated 180 degrees) relative to mass 108A. A load-sensitive resonator 114C is mounted on one side of bending beam 112B. A second load-sensitive resonator 114D is mounted on the opposite side of bending beam 112B. For linear horizontal accelerations A 100 applied to inertial masses 108A and 108B, resonators 114A and 114C sense tensile or compressive stresses, while resonators 114B and 114D sense acceleration A 100 with the opposite polarity. For angular accelerations $\ddot{\Theta}$ 102, paired resonators 114A and 114D and paired resonators 114B and 114C have the opposite polarity (either compressive or tensile). Linear accelerations A 100 are proportional to the difference in the scaled outputs from resonators 114A and 114B as well as to the difference in the scaled outputs from resonators 114C and 114D. Linear accelerations A 100 are also proportional to the difference in the scaled outputs from resonators 114A and 114D as well as to the difference in the scaled outputs from resonators 114B and 114C. Angular accelerations $\ddot{\Theta}$ 102 are proportional to the sum of the scaled outputs from the scaled outputs from resonators 114A and 114D as well as to the sum in the scaled outputs from resonators 114B and 114C. Angular accelerations $\ddot{\Theta}$ 102 are also proportional to the difference of the scaled outputs from the scaled outputs from resonators 114A and 114C as well as to the difference in the scaled outputs from resonators 114B and 114D. Tilts of base 91 relative to Earth's plumb line gravity vector G 106 by angle $\Theta$ 104 apply loads to resonators 114A, 114B, 114C, and 114D that are equivalent to a horizontal acceleration of G*sin $\Theta$. The angular accelerations $\ddot{\Theta}$ 102 may be doubly integrated to calculate angle $\Theta$ 104 and determine tilt effects. Thus digital high precision measurements of horizontal accelerations, angular accelerations, and tilt can be separated and made by calculating the sums and differences of the scaled outputs from paired combinations of resonators 114A, 114B, 114C, and 114D.

Figure 4C:
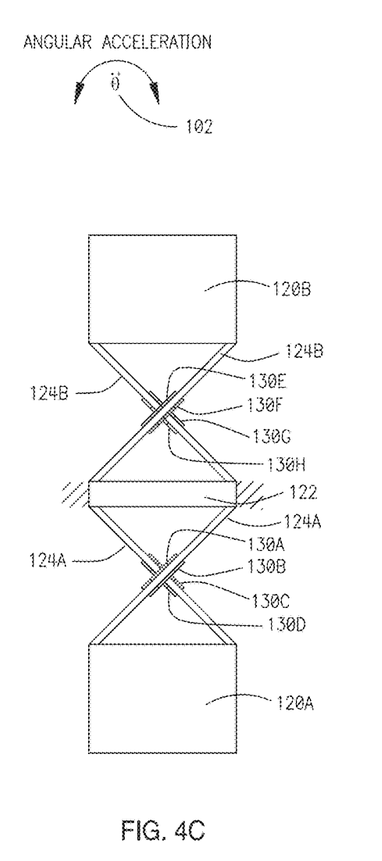
FIG. 4C is a planar view of a combined digital high precision rotation and horizontal acceleration sensor with two inertial masses suspended by crossed flexure bending beams in relatively inverted positions and coupled to load-sensitive resonators according to an embodiment of the present disclosure such that for linear horizontal accelerations applied to the inertial masses, some resonators sense compressive stresses, while other resonators sense tensile stresses. For angular accelerations, some resonators have the same polarity and thus horizontal accelerations can be distinguished from angular accelerations and tilt effects.

FIG. 4C is a planar view of a combined digital high precision rotation and horizontal acceleration sensor according to an embodiment of the disclosure. Pendulous mass 120A is suspended from base 122 by crossed flexing beams pivot 124A. Load-sensitive resonators 130A, 130B, 130C, and 130D, are mounted in pairs on crossed flexing beams pivot 124A. Rotational and horizontal acceleration inputs create bending stresses in the crossed flexing beams pivot 124A that are transmitted to resonators 130A, 130B, 130C, and 130D, and the changes in resonant frequencies are digital measures of the applied loads. Inertial mass 120B is suspended from base 122 by crossed flexing beams pivot 124B in an inverted position (rotated 180 degrees) relative to mass 120A. Load-sensitive resonators 130E, 130F, 130G, and 130H, are mounted in pairs on opposite sides of crossed flexing beams pivot 124B. For linear horizontal accelerations A 100 applied to inertial masses 120A and 120B, resonators 130A, 130D, 130E, and 130H sense tensile or compressive stresses, while resonators 130B, 130C, 130F, and 130G sense acceleration A 100 with the opposite polarity. For angular accelerations G 102, resonators 130A, 130D, 130F, and 130G have the same polarity (either compressive or tensile) while resonators 130B, 130C, 130E, and 130H sense angular accelerations $\ddot{\Theta}$ 102 with the opposite polarity. Linear accelerations A 100 are proportional to the difference in the scaled outputs from any resonator pairs belonging to the two masses and having opposite polarity. Angular accelerations $\ddot{\Theta}$ 102 are proportional to the sum of the scaled outputs from any resonators pairs, one on each mass, and having the same polarity as well as the difference from any resonators pairs, one on each mass, and having the opposite polarity. Tilts of base 122 relative to Earth's plumb line gravity vector G 106 by angle $\Theta$ 104 apply loads to all resonators that are equivalent to a horizontal acceleration of G*sin $\Theta$. The angular acceleration $\ddot{\Theta}$ 102 may be doubly integrated to calculate angle $\Theta$ 104 and determine tilt effects. Thus digital high precision measurements of horizontal accelerations, angular accelerations, and tilt can be made by calculating the sums and differences of the scaled outputs from paired combinations of resonators having similar or opposite polarities.

Figure 5A:
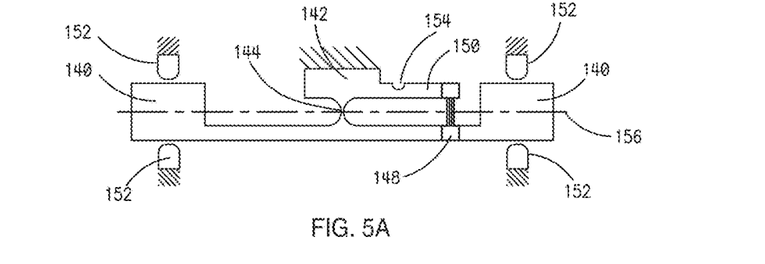
FIG. 5A is a planar view of a digital high precision rotation sensor using load-sensitive resonators to detect angular acceleration inputs applied to two balanced inertial masses suspended from flexure hinge pivots in the horizontal orientation according to an embodiment of the present disclosure.

FIG. 5A is a planar view of a digital high precision rotation sensor in a horizontal orientation according to an embodiment of the disclosure. Two inertial masses 140 are suspended from base 142 by flexure hinge pivot 144. Angular accelerations $\ddot{\Theta}$ 146 generate rotational torques about flexure hinge pivot 144 that are transmitted to load-sensitive resonator 148 by torque and force-transmitting arm 150. Mechanical overload stops 152 are placed to limit the small motion of the inertial masses 140 such that the loads stay within the acceptable range of load-sensitive resonator 148. The range of travel before engaging overload stops 152 can be increased by adding compliant elements to torque and force-transmitting arm 150 such as flexure 154. Inertial masses 140 are balanced such that the center of mass of the inertia bar lies on the pivot point (centerline 156) of flexure hinge pivot 144 to minimize the sensitivity to horizontal accelerations A 158. Masses 140 are also balanced in the vertical direction with respect to Earth's gravity plumb line G 159.

Figure 5B:
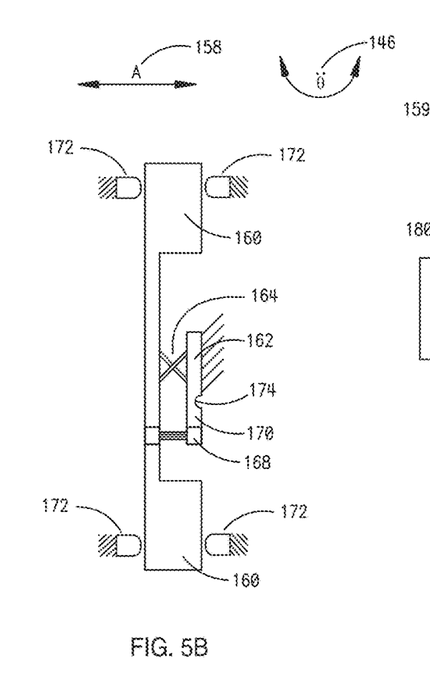
FIG. 5B is a planar view of a digital high precision rotation sensor using load-sensitive resonators to detect angular acceleration inputs applied to two balanced inertial masses suspended from crossed bending beam pivots in the vertical orientation according to an embodiment of the present disclosure.

FIG. 5B is a planar view of a digital high precision rotation sensor in a vertical orientation according to an embodiment of the disclosure. Two inertial masses 160 are suspended from base 162 by crossed flexing beams pivot 164. Angular accelerations $\ddot{\Theta}$ 146 generate rotational torques about crossed flexing beams pivot 164 that are transmitted to load-sensitive resonator 168 by torque and force-transmitting arm 170. Mechanical overload stops 172 are placed to limit the small motion of the inertial masses 160 such that the loads stay within the acceptable range of load-sensitive resonator 168. The range of travel before engaging overload stops 172 can be increased by adding compliant elements to torque and force-transmitting arm 170 such as flexure 174. Inertial masses 160 are balanced in the vertical and horizontal directions such that the center of mass of the inertia bar lies at the pivot point of crossed flexing beams pivot 164.

Figure 5C:
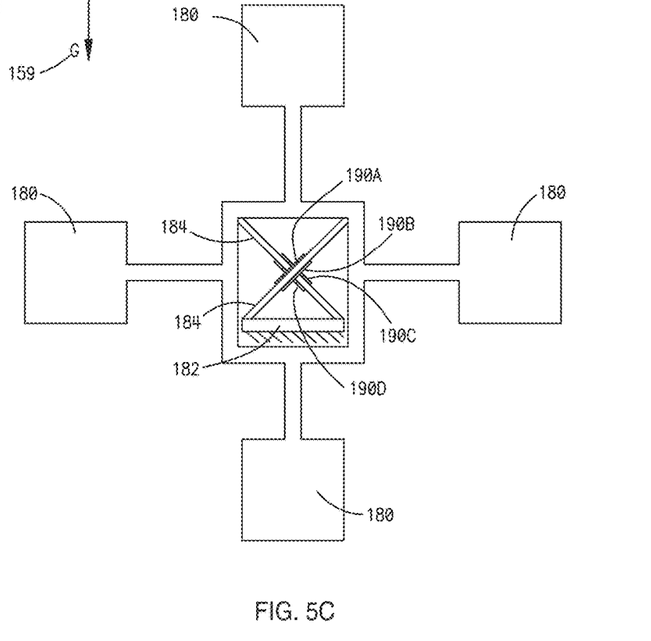
FIG. 5C is a planar view of a digital high precision rotation sensor using load-sensitive resonators to detect angular acceleration inputs applied to four inertial masses suspended from crossed bending beam pivots in a symmetric orientation that reduces the sensitivity to gravity gradients according to an embodiment of the present disclosure.

FIG. 5C is a planar view of a digital high precision rotation sensor using multiple load-sensitive resonators to detect angular acceleration inputs according to an embodiment of the disclosure. Four inertial masses 180 are suspended from base 182 by crossed flexing beams pivot 184. Inertial masses 180 are balanced in the vertical and horizontal directions such that the center of mass lies at the pivot point of crossed flexing beams pivot 184. Load-sensitive resonators 190A, 190B, 190C, and 190D, are mounted in pairs on crossed flexing beams pivot 184. Angular acceleration inputs $\ddot{\Theta}$ 146 create bending stresses in the crossed flexing beams pivot 184 that are transmitted to resonators 190A, 190B, 190C, and 190D. Angular acceleration inputs change the frequencies of load-sensitive resonators 190A, 190B, 190C, and 190D with similar or opposite polarities (tensile or compressive) dependent on their orientation on crossed flexing beams pivot 184. The processing of multiple resonator outputs may reduce common-mode errors and/or improve accuracy and/or performance.

Figure 6A:
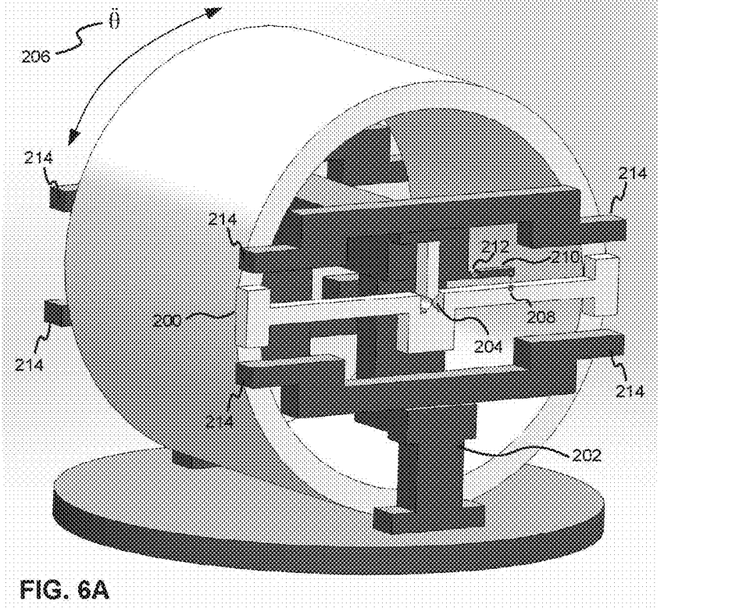
FIG. 6A is an isometric view of a digital high precision rotation sensor using load-sensitive resonators to detect angular acceleration inputs applied to a symmetrical (cylindrical) inertial mass suspended from flexure hinge pivots according to an embodiment of the present disclosure.

FIG. 6A is an isometric view of a digital high precision rotation sensor using load-sensitive resonators to detect angular acceleration inputs according to an embodiment of the disclosure. A symmetrical (cylindrical) inertial mass 200 is suspended from base platform 202 by flexure hinge pivots 204. Angular accelerations $\ddot{\Theta}$ 206 generate rotational torques about pivot 204 that are transmitted to load-sensitive resonator 208 by torque and force-transmitting arm 210. Mechanical overload stops 214 are placed to limit the small motion of the inertial mass 200 such that the loads stay within the acceptable range of load-sensitive resonator 208. The range of travel before engaging overload stops 214 can be increased by adding compliant elements to torque and force-transmitting arm 210 such as flexure 212. Inertial mass 200 is balanced such that its center of mass lies on the rotational axis of flexure hinge pivots 204.

Figure 6B:
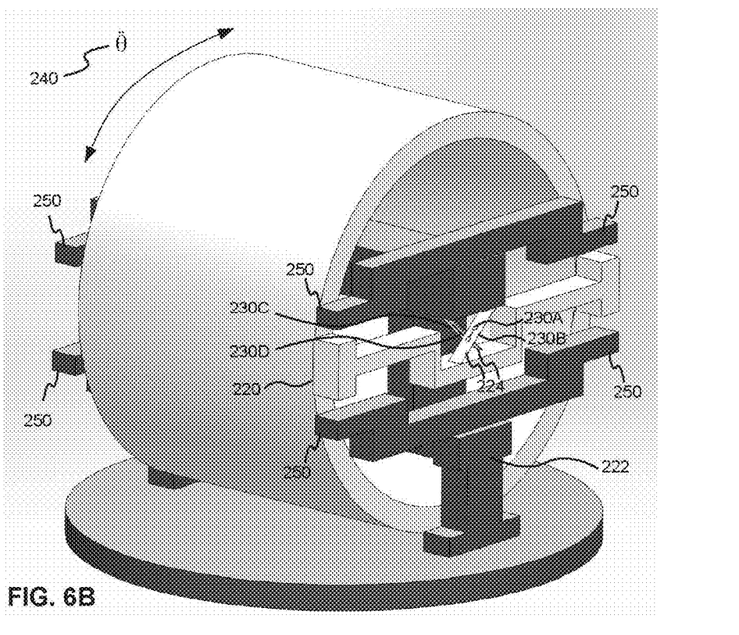
FIG. 6B is an isometric view of a digital high precision rotation sensor using load-sensitive resonators to detect angular acceleration inputs applied to a symmetrical (cylindrical) inertial mass suspended from crossed bending beam pivots according to an embodiment of the present disclosure.

FIG. 6B is an isometric view of a digital high precision rotation sensor using load-sensitive resonators to detect angular acceleration inputs according to an embodiment of the disclosure. A symmetrical (cylindrical) inertial mass 220 is suspended from base platform 222 by crossed flexing beams pivot 224. Inertial mass 220 is balanced such that its center of mass lies at the pivot point of crossed flexing beams pivot 224. Load-sensitive resonators 230A, 230B, 230C, and 230D, are mounted in pairs on crossed flexing beams pivot 224. Angular acceleration inputs $\ddot{\Theta}$ 240 create bending stresses in the crossed flexing beams pivot 224 that are transmitted to load-sensitive resonators 230A, 230B, 230C, and 230D. Angular acceleration inputs change the frequencies of load-sensitive resonators 230A, 230B, 230C, and 230D with similar or opposite polarities (tensile or compressive) dependent on their orientation on crossed flexing beams pivot 224. The processing of multiple resonator outputs may reduce common-mode errors and/or improve accuracy and/or performance. Mechanical overload stops 250 are placed to limit the small motion of the inertial mass 220 such that the loads stay within the acceptable range of load-sensitive resonators 230A, 230B, 230C, and 230D.

Figure 7:
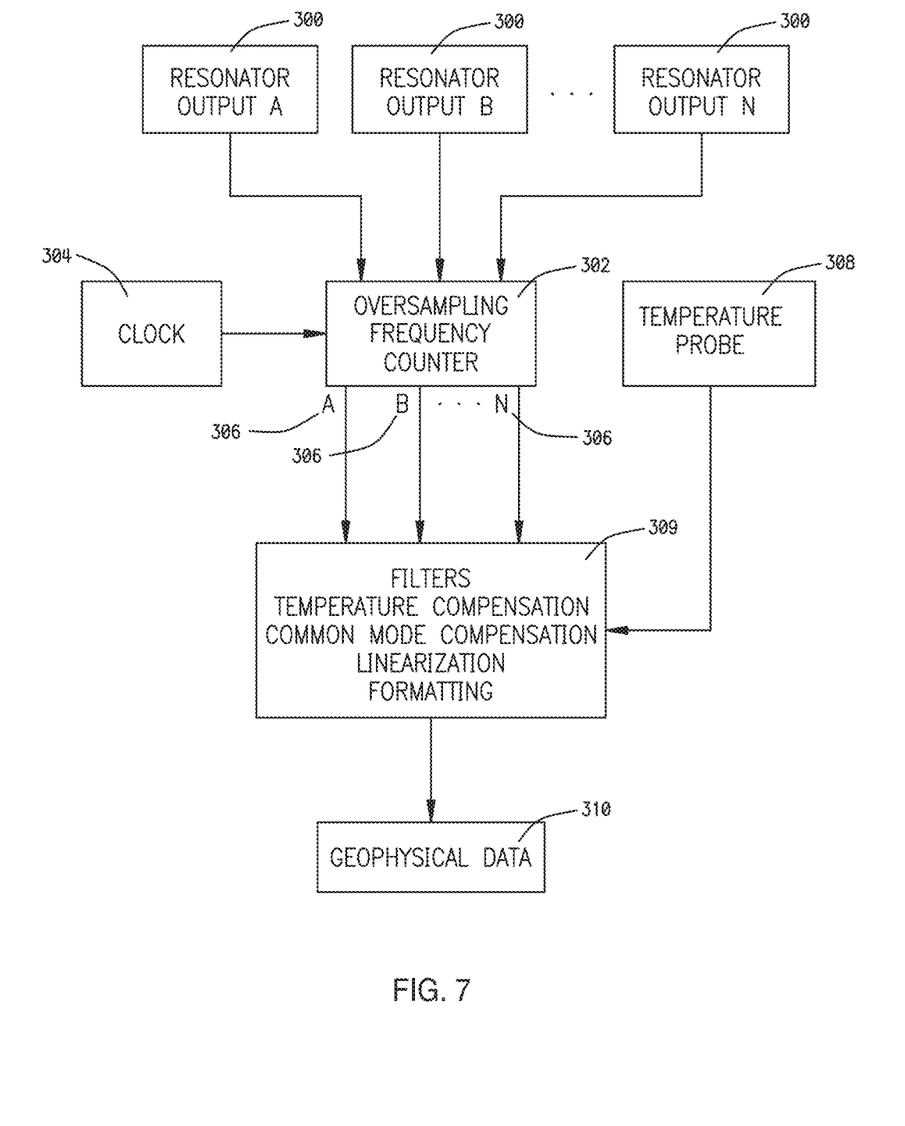
FIG. 7 is a block diagram of the major components of a digital high precision geophysical measurement system using multiple frequency-period outputs from load-sensitive resonators, a temperature probe, and a high-frequency clock standard according to an embodiment of the present disclosure. A high-resolution frequency counter measures the frequency-period outputs from the load-sensitive resonators in comparison to the reference clock and passes the digital signals to a processing unit that includes anti-aliasing filters, digital signal processing, temperature compensation, common mode error compensation between outputs, and linearization of the frequency-period signals into engineering units.

FIG. 7 is a block diagram of the major components of a digital high precision geophysical measurement system according to an embodiment of the present disclosure. All six seismic degrees of freedom (3 rotational and 3 translational) and pressures can be measured with load-sensitive resonators. The load-sensitive resonator frequency-period outputs A, B . . . N 300 are measured with an oversampled high-resolution frequency counter 302 in comparison to the reference high-frequency clock standard 304. Oversampled outputs A, B . . . N 306 and the output from temperature probe 308 are passed to processing unit 309 that includes anti-aliasing filters, digital signal processing, temperature compensation, common mode error compensation between outputs A, B . . . N 306, and linearization of the signals into engineering units for geophysical data 310.

Of course, it is to be appreciated that any one of the examples, embodiments or processes described herein may be combined with one or more other examples, embodiments and/or processes or be separated and/or performed amongst separate devices or device portions in accordance with the present systems, devices and methods.

Finally, the above-discussion is intended to be merely illustrative of the present apparatuses, systems, and methods, and should not be construed as limiting the appended claims to any particular embodiment or group of embodiments. Thus, while the present apparatuses, systems, and methods have been described in particular detail with reference to exemplary embodiments, it should also be appreciated that numerous modifications and alternative embodiments may be devised by those having ordinary skill in the art without departing from the broader and intended spirit and scope of the present apparatuses, systems, and methods as set forth in the claims that follow. Accordingly, the specification and drawings are to be regarded in an illustrative manner and are not intended to limit the scope of the appended claims.

What is claimed is:

1. A rotation sensor, comprising:
a base frame;
a first inertial mass aligned with a static gravity field;
a first pivot connecting the first inertial mass to the base frame, the first pivot defining a rotational axis;
a first load-transmitting structure connected to the first inertial mass; and
a first load-sensitive resonator having a first end portion connected to the base frame and a second end portion connected to the load-transmitting structure that allows rotation-induced loads to be applied, in a plane of rotation about and perpendicular to the rotational axis, to the first load-sensitive resonator.

2. The sensor of claim 1 wherein the first load-transmitting structure includes compliant elements in the plane of rotation about the rotational axis.

3. The sensor of claim 1, wherein the first inertial mass comprises a pendulous inertial mass aligned with the static gravity field.

4. The sensor of claim 3 wherein the first load-transmitting structure includes compliant elements in the plane of rotation.

5. The sensor of claim 3, wherein the first pivot comprises a first bending beam, and the first load-sensitive resonator is an integral part of, or mounted on, a first side of the first bending beam.

6. The sensor of claim 5 further comprising a second load-sensitive resonator which is an integral part of, or mounted on, a second side of the first bending beam, wherein the second side is opposite the first side, such that rotation-induced loads apply tensile or compressive loads of opposite polarity to the first and second load-sensitive resonators on opposite sides of the first bending beam.

7. A measurement system comprising the sensor of claim 6 and electronic means to excite natural resonant frequencies of the first and second load-sensitive resonators, and further comprising frequency counters that measure frequency outputs of the first and second load-sensitive resonators and a processing unit that processes the frequency outputs and computes the sums and differences of the processed frequency outputs of the first and second load-sensitive resonators having similar or opposite tensile-compressive polarity.

8. The sensor of claim 3, wherein the first pivot comprises a first crossed flexing-beams pivot of at least two crossed beams and the first load-sensitive resonator is an integral part of, or mounted on, a first side of the first crossed flexing-beams pivot.

9. The sensor of claim 8 further comprising a second load-sensitive resonator as an integral part of, or mounted on, a second side of the first crossed flexing-beams pivot such that rotation-induced loads apply tensile or compressive loads of opposite polarity to the first and second load-sensitive resonators on opposite sides of the first crossed flexing-beams pivot.

10. A measurement system comprising the sensor of claim 9 and electronic means to excite natural resonant frequencies of the first and second load-sensitive resonators, and further comprising frequency counters that measure frequency outputs of the first and second load-sensitive resonators and a processing unit that processes the frequency outputs and computes sums and differences of the processed frequency outputs of the first and second load-sensitive resonators having similar or opposite tensile-compressive polarity.

11. The sensor of claim 3, further comprising:
an inverted inertial mass;
a second pivot connecting the inverted inertial mass to the base frame, wherein the second pivot defines a second rotational axis; and
a second load-transmitting structure connected to the inverted inertial mass; and
a second load-sensitive resonator having a first end portion connected to the base frame and a second end portion connected to the load-transmitting structure that allows rotation-induced loads to be applied in a plane of rotation about and perpendicular to the rotational axis to the second load-sensitive resonator.

12. A measurement system comprising the sensor of claim 11 and electronic means to excite natural resonant frequencies of the first and second load-sensitive resonators, and further comprising frequency counters that measure frequency outputs of the first and second load-sensitive resonators and a processing unit that computes sums and differences of the processed frequency outputs of the first and second load-sensitive resonators having similar or opposite tensile-compressive polarity.

13. The sensor of claim 5, further comprising:
an inverted inertial mass;
a second bending beam connecting the inverted inertial mass to the base frame; and
a second load-sensitive resonator as an integral part of, or mounted on, one side of the second bending beam such that rotation-induced loads are applied to the second load-sensitive resonator.

14. The sensor of claim 13 further comprising a third load-sensitive resonator and a fourth load-sensitive resonator as an integral part of, or mounted on, other sides of the first and second bending beams such that rotation-induced loads apply tensile or compressive loads of opposite polarity to the load-sensitive resonators on opposite sides of the first and second bending beams.

15. A measurement system comprising the sensor of claim 14 and electronic means to excite natural resonant frequencies of the first, second, third, and fourth load-sensitive resonators, and further comprising frequency counters that measure frequency outputs of the first, second, third, and fourth load-sensitive resonators and a processing unit that processes the frequency outputs and computes sums and differences of the processed frequency outputs of the load-sensitive resonators having similar or opposite tensile-compressive polarity.

16. The sensor of claim 3, further comprising:
an inverted inertial mass;
a second crossed flexing-beams pivot connecting the inverted inertial mass to the base frame; and
a second load-sensitive resonator as an integral part of, or mounted on, one side of the second crossed flexing-beams pivot such that rotation-induced loads are applied to the first and second load-sensitive resonators.

17. The sensor of claim 16 further comprising a third and a fourth load-sensitive resonators as an integral part of, or mounted on, the other sides of the first and second crossed flexing-beams pivots such that rotation-induced loads apply tensile or compressive loads of opposite polarity to the first and second load-sensitive resonators on opposite sides of the first and second crossed flexing-beams pivots.

18. A measurement system comprising the sensor of claim 17 and electronic means to excite natural resonant frequencies of the first, second, third, and fourth load-sensitive resonators, and further comprising frequency counters that measure frequency outputs of the first, second, third, and fourth load-sensitive resonators and a processing unit that processes the frequency outputs and computes sums and differences of the processed frequency outputs of the first, second, third, and fourth load-sensitive resonators having similar or opposite tensile-compressive polarity.

19. The sensor of claim 1, wherein the inertial mass comprises an inertial mass having a center of mass at the rotational axis.

20. The sensor of claim 19 wherein the inertial mass has symmetry about the rotational axis.

21. The sensor of claim 8, wherein a center of mass of the inertial mass coincides with the rotational axis.

22. The sensor of claim 21 further comprising load-sensitive resonators on other sides of the crossed flexing-beams pivot such that rotation-induced loads apply tensile or compressive loads of opposite polarity to the load-sensitive resonators on opposite sides of the crossed flexing-beams pivot.

23. The sensor of claim 21 wherein the inertial mass has symmetry about the rotational axis.

24. A measurement system comprising the sensor of claim 22 and electronic means to excite natural resonant frequencies of the load-sensitive resonators, and further comprising frequency counters that measure frequency outputs of the load-sensitive resonators and a processing unit that processes the frequency outputs and computes sums and differences of the processed frequency outputs of the load-sensitive resonators having similar or opposite tensile-compressive polarity.

25. A geophysical measurement system comprising the sensor of claim 1 and further comprising:
linear acceleration sensors with load-sensitive resonators;
electronic means to excite natural resonant frequencies of the resonators;
a reference high-frequency clock standard;
a high-resolution frequency counter;
a temperature probe; and
a signal processing unit that processes frequency outputs from the high-resolution frequency counter and computes sums and differences of the processed frequency outputs.

26. A method of making geophysical measurements with the measurement system of claim 25 wherein the load-sensitive resonators provide frequency-period outputs that are oversampled with the high-resolution frequency counter in comparison to the reference high-frequency clock standard and the oversampled outputs and an output from the temperature probe are passed to the signal processing unit that includes anti-aliasing filters, digital signal processing, temperature compensation, common mode error compensation, and linearization of signals into engineering units.

* * * * *